(12) United States Patent
Shimizu

(10) Patent No.: US 7,854,179 B2
(45) Date of Patent: Dec. 21, 2010

(54) SHIFT LEVER ASSEMBLY

(75) Inventor: Akira Shimizu, Hamamatsu (JP)

(73) Assignee: Fuji Kiko Co., Ltd., Kosai-shi, Shizuoka-ken (JP)

( * ) Notice: Subject to any disclaimer, the term of this patent is extended or adjusted under 35 U.S.C. 154(b) by 209 days.

(21) Appl. No.: 12/230,300

(22) Filed: Aug. 27, 2008

(65) Prior Publication Data
US 2009/0056490 A1 Mar. 5, 2009

(30) Foreign Application Priority Data
Aug. 31, 2007 (JP) ............................. 2007-226768

(51) Int. Cl.
*B60K 20/00* (2006.01)
*G05G 9/00* (2006.01)
*F16H 59/04* (2006.01)

(52) U.S. Cl. .................... 74/473.1; 74/473.3; 74/473.33

(58) Field of Classification Search ................ 74/473.1, 74/473.3, 473.33; 180/232; 280/748
See application file for complete search history.

(56) References Cited

U.S. PATENT DOCUMENTS

| | | | |
|---|---|---|---|
| 5,992,261 A * | 11/1999 | Iwata et al. ................ | 74/473.1 |
| 6,082,216 A * | 7/2000 | Watanabe et al. .......... | 74/473.3 |
| 6,273,466 B1 * | 8/2001 | Suzuki et al. .............. | 280/748 |
| 6,286,385 B1 * | 9/2001 | Nishimura et al. ......... | 74/473.3 |
| 6,584,870 B2 * | 7/2003 | Nishimura et al. ......... | 74/473.3 |

FOREIGN PATENT DOCUMENTS

| | | |
|---|---|---|
| JP | 10-86689 | 4/1998 |
| JP | 2006-131030 | 5/2006 |

* cited by examiner

*Primary Examiner*—Thomas R Hannon
*Assistant Examiner*—Justin Krause
(74) *Attorney, Agent, or Firm*—The Nath Law Group; Jerald L. Meyer; Robert T. Burns

(57) ABSTRACT

A shift lever assembly includes a shift lever swingably with a rotational axis as a swing support point, an axis supporting bracket for supporting the rotational axis, two axis supporting elements for supporting both ends of the rotational axis together with the axis supporting bracket. In addition, two beams are provided with each of the axis supporting elements. The beams will break off in case where an impact load is to be applied via the shift lever. Furthermore, a metal plate is provided with the axis supporting bracket for each of the axis supporting elements. The metal plate will be bent by the each of the axis supporting elements moving after break-offs of the beams. According to the shift lever assembly, stroke displacement for energy absorbing can be made relatively long. In addition, relatively large impact energy can be absorbed with short stroke displacement.

4 Claims, 14 Drawing Sheets

FIG. 1A
FIG. 1B
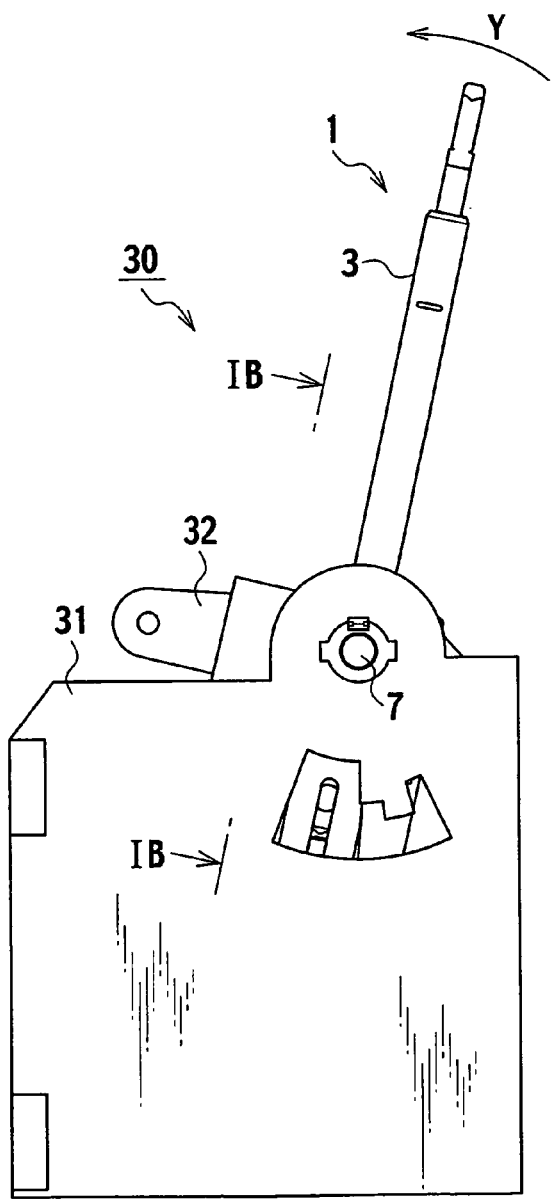
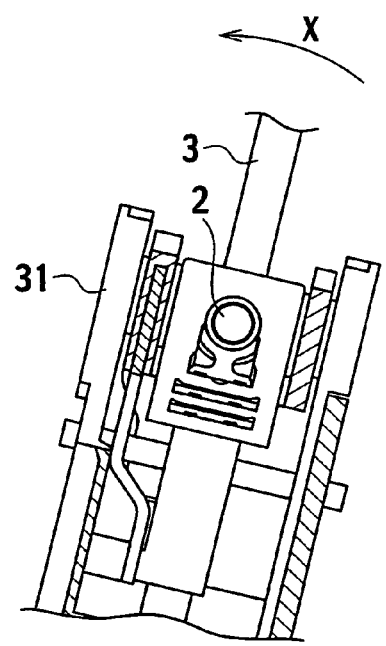

SHIFT LEVER ASSEMBLY

BACKGROUND OF THE INVENTION

1. Field of the Invention

The present invention relates to a shift lever assembly with an impact energy absorbing structure for absorbing impact energy applied to a shift lever.

2. Description of Related Art

A shift lever assembly including an impact energy absorbing structure from the standpoint of crash safety has been known. Such an impact energy absorbing structure is provided at an operable component for gear changing on a vehicle. An occupant in a vehicle compartment can change shift range positions of a transmission by operating a shift lever at the operable component. Japanese Patent No. 3789567 (Patent Document 1) and Japanese Patent Application Laid-open No. 2006-131030 (Patent Document 1) have disclosed such a shift lever assembly. In the above-mentioned shift lever assemblies, portion of the shift lever assembly can absorb impact energy at occupant's striking on the shift lever in order to restrain occupant's injury.

The shift lever assembly shown in the Patent Document 1 includes a bracket for coupling a shift lever with a rotational axial rod and a pin for connecting the bracket and the rotational axial rod. In addition, two pairs of a thin fuse portion and an escape hole are formed on the bracket. According to the assembly, the rotational axial rod breaks off the thin fuse portions and then enters into the escape holes when an impact load has applied to the shift lever. Therefore, the impact load can be absorbed by breaking-off of the thin fuse portions.

The shift lever assembly shown in the Patent Document 2 includes a supporting portion for supporting an axial pin of a shift lever and plural ribs aligned along a moving direction of the axial pin at an impact load applying to the shift lever. Each of the ribs extends along a direction almost perpendicular to the moving direction. According to the assembly, the axial pin breaks off the ribs sequentially when the axial pin moves along the moving direction due to the impact load. Therefore, the impact load can be absorbed by breaking-off of the ribs.

SUMMARY OF THE INVENTION

However, the assembly shown in the Patent Document 1 has a configuration in which the rotational axial rod breaks off the thin fuse portions and then enters into the escape holes when an impact load has applied to the shift lever. Therefore, stroke displacement of the rotational axial rod must be limited by a longitudinal dimension of the escaping holes. In other words, stroke displacement for energy absorbing must be limited.

On the other hand, in the assembly shown in the Patent Document 2, since the plural ribs aligned along the moving direction of the axial pin are formed integrally with a resin-molded assembly main body, energy absorbing capacity in each of the ribs is small. Therefore, it is needed to increase the number of the ribs in order to absorb large impact energy. In this case, stroke displacement for energy absorbing must be long.

The present invention has been achieved in order to solve the above problems, and an object of the invention is to provide a shift lever assembly that can make stroke displacement for energy absorbing relatively long and can absorb relatively large impact energy with short stroke displacement.

An aspect of the present invention provides a shift lever assembly that includes a shift lever capable of swinging with a rotational axis as a swing support point, an axis supporting bracket for supporting the rotational axis, a pair of axis supporting elements for supporting both ends of the rotational axis together with the axis supporting bracket, a plurality of beams provided with the axis supporting elements and can break off in case where an impact load is applied via the shift lever, and a plurality of metal plates provided with the axis supporting bracket in relations to the axis supporting elements and can be bent with being pressed by the axis supporting elements being moving after the beams having broken off.

According to the above configuration, in case where an impact load has exceeded a predetermined load due to an occupant's contact or the like and then, the plurality of beams firstly breaks off and then the rotational axis and the axis supporting elements start to move. Subsequently, the axis supporting elements pushes the plurality of metal plates and then the plurality of metal plates is bent. Therefore, in case where an impact load is applied via the shift lever, an impact energy can be absorbed in two steps of breaking off of the plurality of beams and bending of the plurality of metal plates as the axis supporting elements can be displaced in a relatively long distance. In other words, this configuration can be applied to a shift lever which needs a relatively long energy absorbing stroke displacement. In addition, since impact energy is absorbed by bending deformation of the plurality of metal plates, relatively large impact energy can be absorbed with shorter stroke displacement than stroke displacement for energy absorbing in a conventional shift lever assembly. Furthermore, since the impact load can be easily adjusted by adjusting dimension (width, thickness or the like) of the metal plates, severely high dimensional accuracy is not needed for energy absorbing components.

It is preferable that one metal plate in the plurality of metal plates is provided for each of the axis supporting elements. The one metal plate is disposed within a range where the each of the axis supporting elements moves and extends a direction almost perpendicular to a moving direction of the each of the axis supporting elements.

According to the above configuration, in case where the pair of axis supporting elements moves after break-offs of the plurality of beams due to an impact load applied to the shift lever, the each of the axis supporting elements pushes one surface of the one metal plate in the direction almost perpendicular to the moving direction and thereby the one plate can be bent under a stable condition.

Alternatively, it is preferable that layered two or more metal plates in the plurality of metal plates are provided in the same number with being spaced away each other for each of the axis supporting elements. The layered two or more metal plates are disposed within a range where the each of the axis supporting elements moves and extend a direction almost perpendicular to a moving direction of the each of the axis supporting elements.

According to the above configuration, in case where the pair of axis supporting elements moves after break-offs of the plurality of beams due to an impact load applied to the shift lever, the each of the axis supporting elements pushes each one surface of the layered two or more metal plates sequentially in the direction almost perpendicular to the moving direction and thereby the layered two or more metal plates can be bent under a stable condition. In addition, since the layered two or more metal plates are sequentially bent by the each of the axis supporting elements, an impact energy can be absorbed in a relatively long displacement and thereby capacity for absorbing an impact energy can be increased.

It is preferable that the pair of axis supporting elements is integrally formed with the axis supporting bracket.

According to the above configuration, since it is not needed to provide the pair of the axis supporting elements separately from the axis supporting bracket, the number of components can be reduced.

BRIEF DESCRIPTION OF THE DRAWINGS

FIG. 1A is a side view of a shift lever assembly according to a first embodiment of the present invention;

FIG. 1B is a cross-sectional view taken along a line IB-IB in FIG. 1A;

DETAILED DESCRIPTION OF THE EMBODIMENTS

Figure 2:
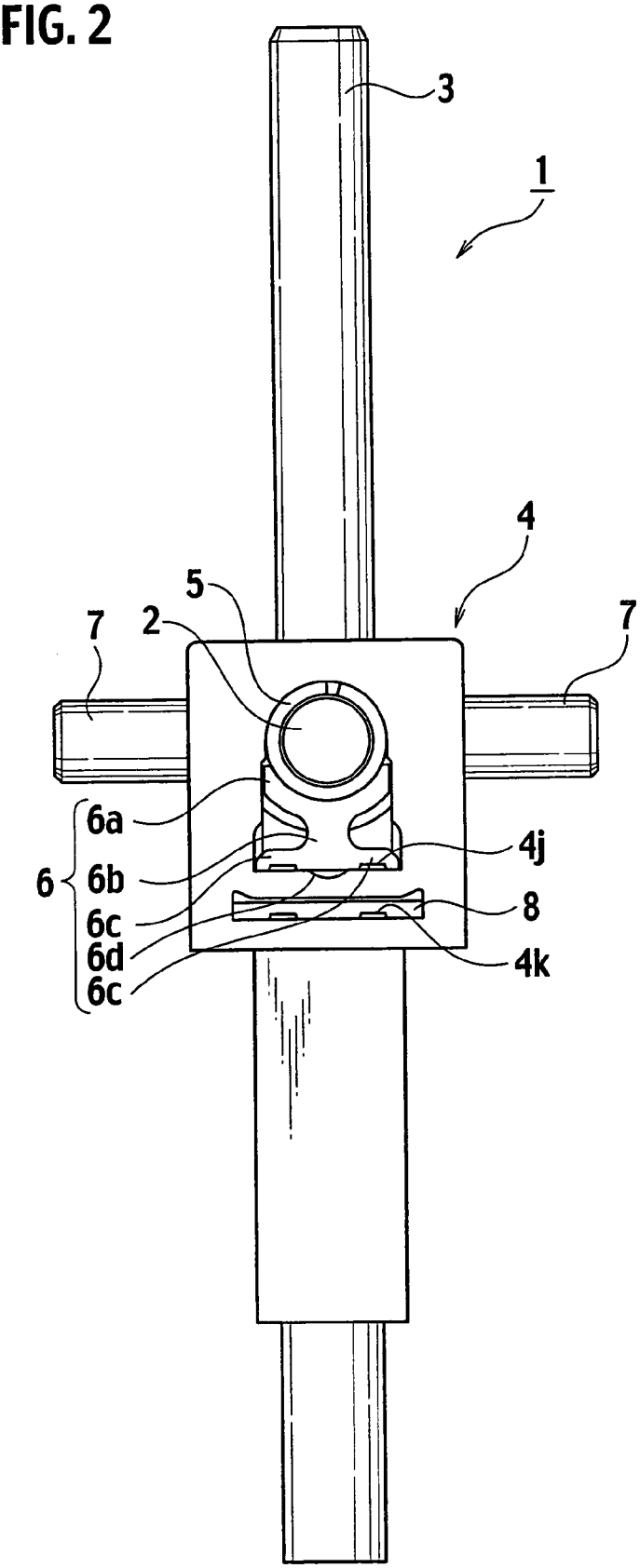
FIG. 2 is a front view of a shift lever main element in the first embodiment.

Hereinafter, embodiments according to the present invention will be explained with reference to drawings.

First Embodiment

FIGS. 1A to 12 shows a first embodiment according to the present invention. Note that walls of an axis supporting bracket (yoke) 4 is partially removed in FIGS. 11A to 11E in order to make an inside of the axis supporting bracket (yoke) 4 conspicuous.

As shown in FIGS. 1A and 1B, a shift lever assembly 30 includes a base 31 and a shift lever main element 1. The base 31 is made of resin and fixed onto a vehicle body. The shift lever main element 1 is swingably supported to the base 31. The shift lever main element 1 can change its shift range positions due to a driver's operation. The shift lever main element 1 includes a shift lever 3 swingably supported by the base 31 and a resin-made knob (not shown) attached at an upper end of the shift lever 3. Rotational axes 7 are formed on the shift lever main element 1. Since the rotational axes 7 are supported by the base, the shift lever main element 1 can swing along a direction Y (see FIG. 1A) on the base 31 for changing its shift range positions. In addition, the shift lever 3 can swing along a direction X (see FIG. 1B) for switching into a manual shift mode with a rotational axis 2 as a swing support point.

In addition, an indicator casing (not shown) is arranged above the base 31, on which range positions are indicated. A slide hole is formed at the center of the indicator casing. The shift lever main element 1 swings within and along the slide hole due to being operated. Further, a wire, a linkage or the like is connected to the shift lever main element 1 via a bracket 32 (see FIG. 1). The wire, the linkage or the like is linked with a transmission. Therefore, the transmission changes its gear positions due to operations of the shift lever main element 1.

Figure 3:
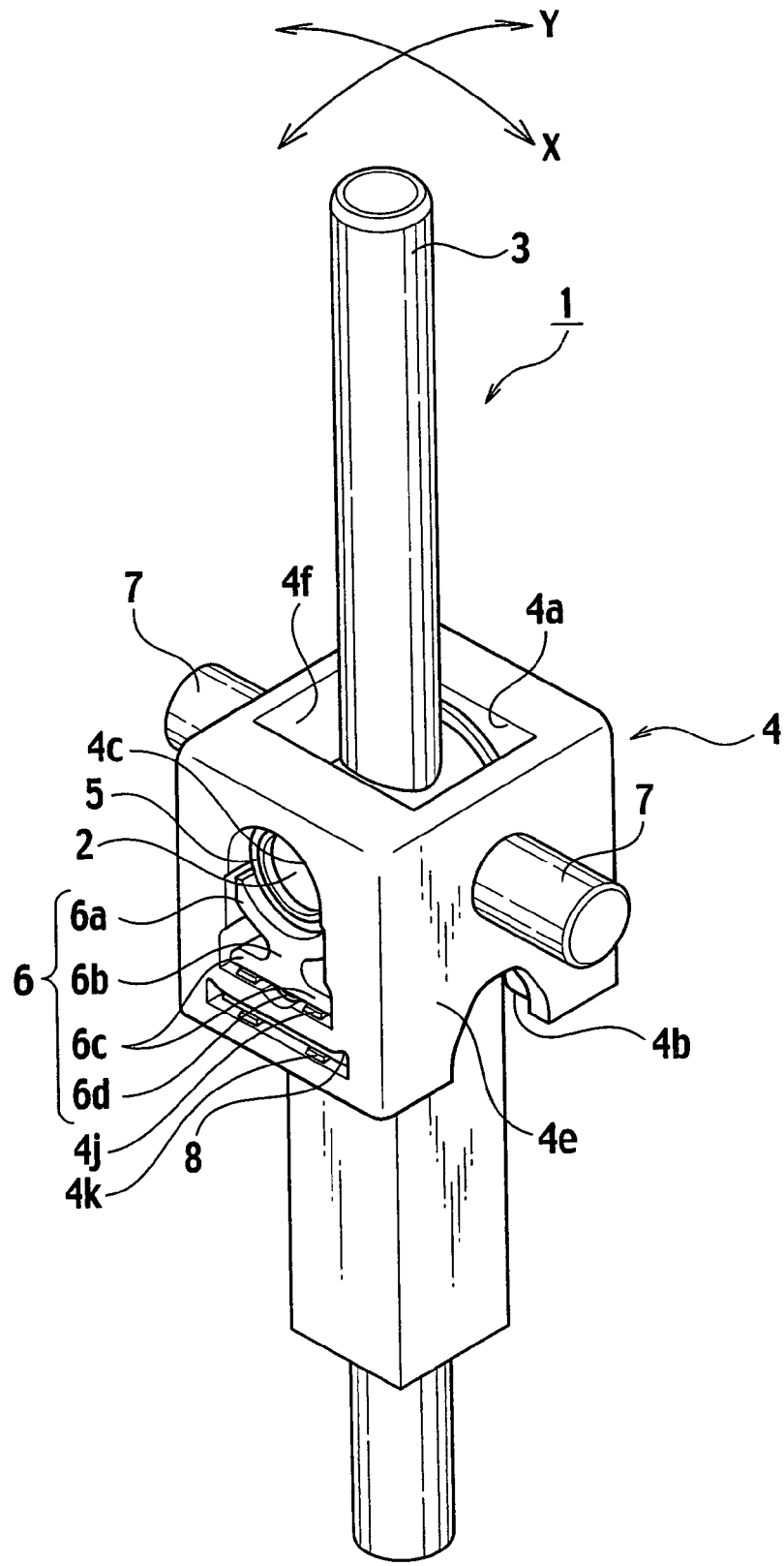
FIG. 3 is a perspective view of the shift lever main element in the first embodiment.
Figure 4:
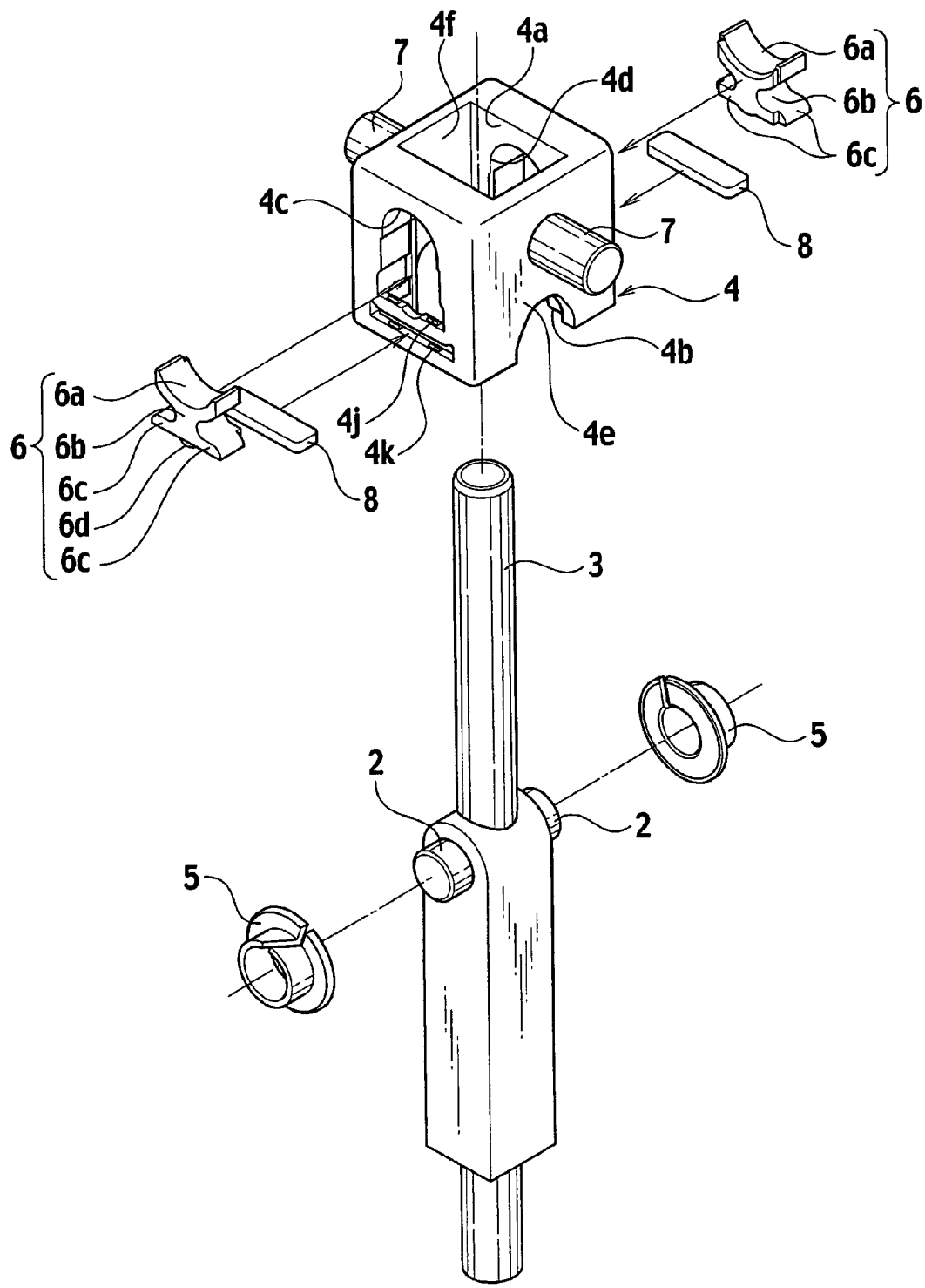
FIG. 4 is an exploded perspective view of the shift lever main element in the first embodiment.

As shown in FIGS. 3 and 4, the shift lever main element 1 includes the shift lever 3, a yoke 4, a pair of axis supporting elements 6 and a metal plate 8. The shift lever 3 extends in a direction perpendicular to the rotational axis 2 and is connected with the rotational axis 2. The yoke (axis supporting bracket) 4 is provided bridging the rotational axis 2. Each of the axis supporting elements 6 is coupled within the yoke 4 and supports each end of the rotational axis 2 via a bearing sheet 5. The metal plate 8 is installed in the yoke 4 and will be bended with being pressed by the axis supporting elements 6 in case where the axis supporting elements 6 are to be displaced.

Figure 5:
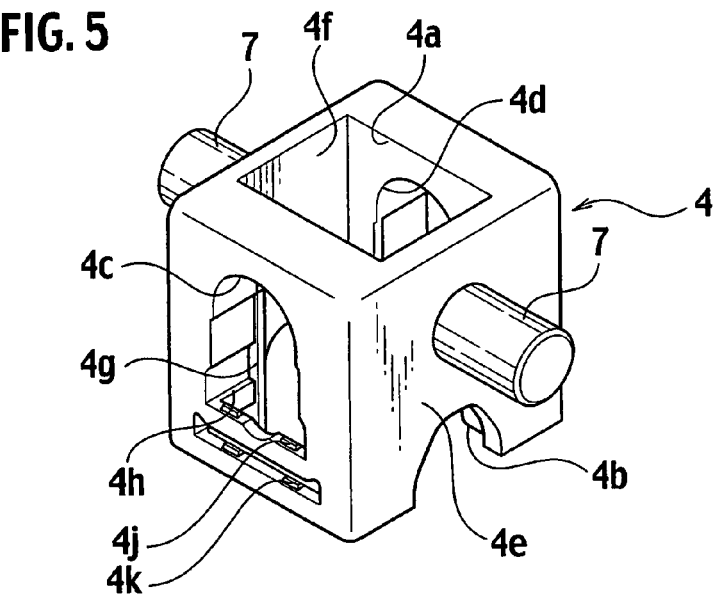
FIG. 5 is a perspective view of an axis supporting bracket (yoke) in the first embodiment.
Figure 6:
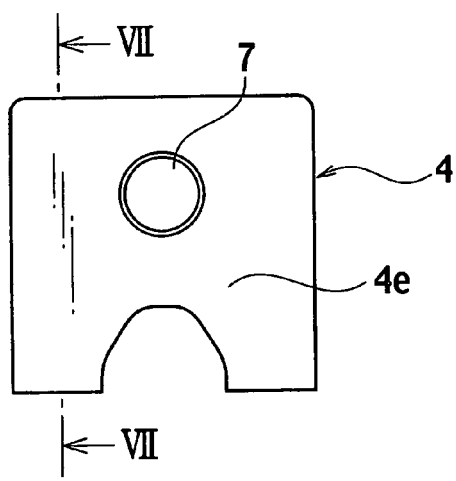
FIG. 6 is a side view of the axis supporting bracket (yoke) in the first embodiment.
Figure 7:
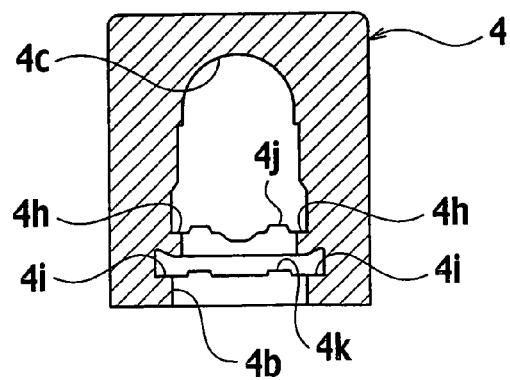
FIG. 7 is a cross-sectional view taken along a line VII-VII in FIG. 6.

As shown in FIGS. 5 to 7, openings 4a and 4b are formed on a top and a bottom of the yoke 4, respectively, and openings 4c and 4d are formed on a pair of opposite side of the yoke 4, respectively. Side walls 4e and 4f are provided at another pair of opposite sides of the yoke 4, respectively. Both of the rotational axes 7 are projected outward from the side walls 4e and 4f, respectively. For example, the shift lever 3 is configured to swing along the direction X shown in FIGS. 1B and 3 for switching into the manual shift mode of the shift lever assembly 30 with the rotational axis 2 as the swing support point and to swing along the direction Y shown in FIGS. 1A and 3 for changing the shift range positions of the shift lever assembly 30 with the rotational axis 7 as the swing support point.

The openings 4c and 4d are provided on an axial direction of the rotational axis 2, respectively. Each upper edge of the openings 4c and 4d has a half-circular shape and the bearing sheets 5 attached onto the rotational axis 2 are coupled with the upper edges of the openings 4c and 4d. The axis supporting elements 6 are coupled in lower portions of the openings 4c and 4d so as to support lower surfaces of the bearing sheets 5, respectively. In addition, the side walls 4e and 4f of the yoke 4 are provided on both sides of the rotational axis 2 and extend parallel to the axial direction of the rotational axis 2. In other words, the yoke 4 is provided so as to bridge over the rotational axis 2.

Figure 8:
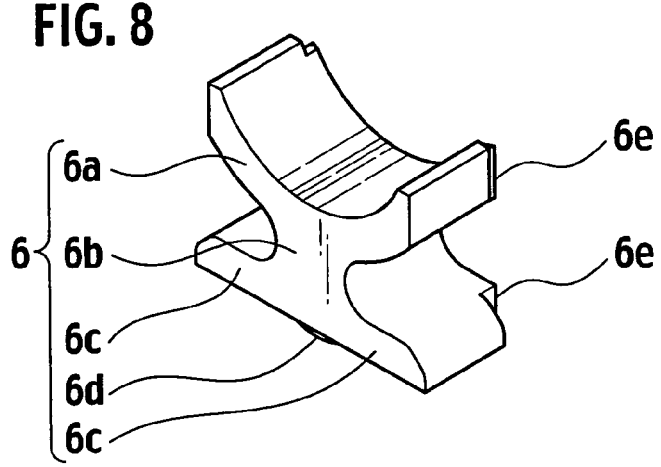
FIG. 8 is a perspective view of an axis supporting element in the first embodiment.
Figure 9:
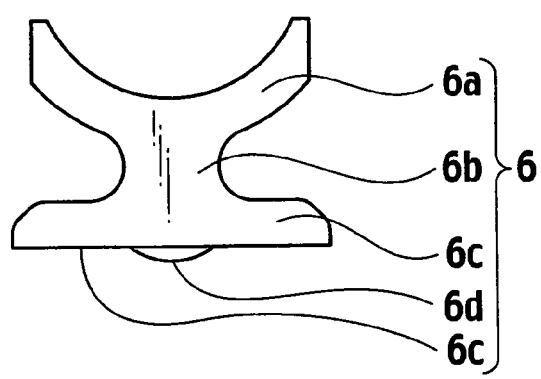
FIG. 9 is a front view of the axis supporting element in the first embodiment.
Figure 10:
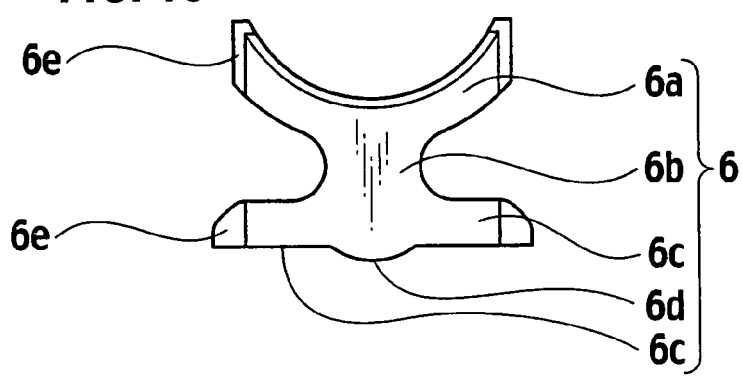
FIG. 10 is a back view of the axis supporting element in the first embodiment.
Figure 11:
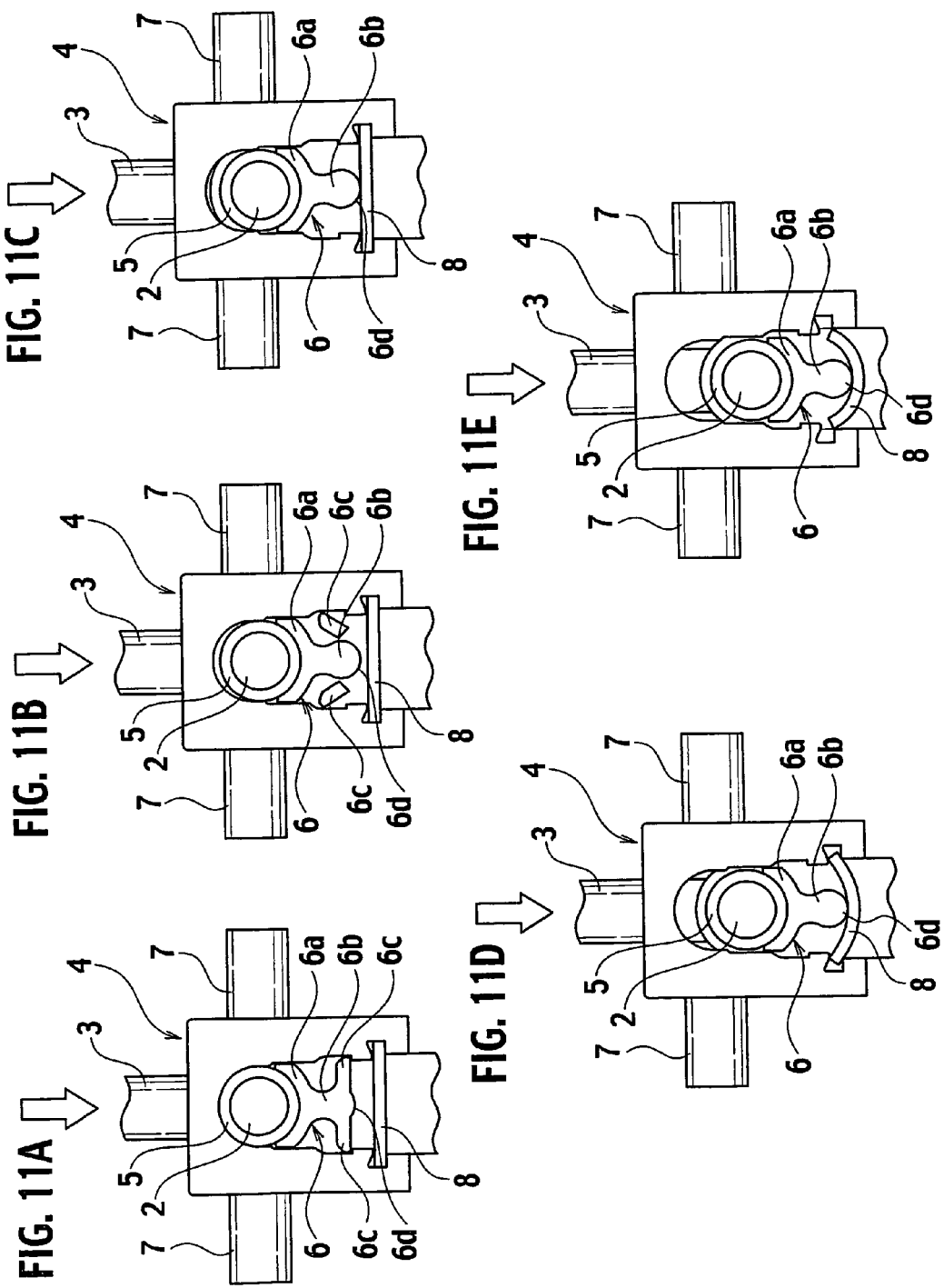
FIGS. 11A to 11E are explanatory diagrams showing an operation of the assembly in the first embodiment when applying an impact load to a shift lever.

As shown in FIGS. 8 to 10, each of the axis supporting elements 6 includes an arch-shaped axis supporting portion 6a for supporting the lower surface of the bearing sheet 5, a pillar 6b connecting on the center of the axis supporting portion 6a and a pair of beams 6c opposingly projecting laterally from a bottom end of the pillar 6b and a round bulge 6d. The pair of beams 6c will be break off in case where an impact load is to be applied via the shift lever 3.

In addition, as shown in FIG. 5, guiding steps 4g are provided longitudinally on the inner surface of the yoke 4. The guiding steps 4g contact with both sides of the axis supporting elements 6 in order to guide downward slides of the axis supporting elements 6. Hooks 4h are provided on a lower end of the inner surface of the side walls 4e and 4f, respectively. The both ends of the pair of the beams 6c are laid on the hooks 4h, respectively. Other hooks 4i are provided below the hooks 4h. The both ends of the metal plates 8 are laid on the other hooks 4i, respectively. In addition, stoppers 4j and 4k are provided on the hooks 4h and 4i in order to prevent drop-offs of the axis supporting elements 6 and the metal plates 8. Furthermore, guided notches 6e are formed on the both ends of the axis supporting portion 6a and the pair of beams 6c, respectively. The guided notches 6e are slidably contacted with the guiding steps 4g and thereby the axis supporting elements 6 are aligned in relation to the yoke 4.

The metal plates 8 are arranged within a range where the pair of the axis supporting elements 6 move, i.e. a range from the openings 4c and 4d toward the bottom opening 4b and extend a direction almost perpendicular to a moving direction of the pair of the axis supporting elements 6.

In assembling the shift lever main element 1 of the first embodiment, the rotational axis 2 and the bearing sheets 5 are inserted into the yoke 4 and coupled at the openings 4c and 4d so as to project the shift lever 3 upward from the opening 4a opened at the top of the yoke 4. And then, the axis supporting elements 6 are installed at the lower portions of the openings 4c and 4d of the yoke 4 so as to support the rotational axis 2 and the bearing sheets 5. At this time, both ends of the pair of beams 6c of the axis supporting elements 6 are laid on the hooks 4h of the yoke 4 and the axis supporting portion 6a is loosely supported between the side walls 4e and 4f of the yoke 4. In addition, the metal plates 8 are laid on the hooks 4i of the yoke 4.

Figure 12:
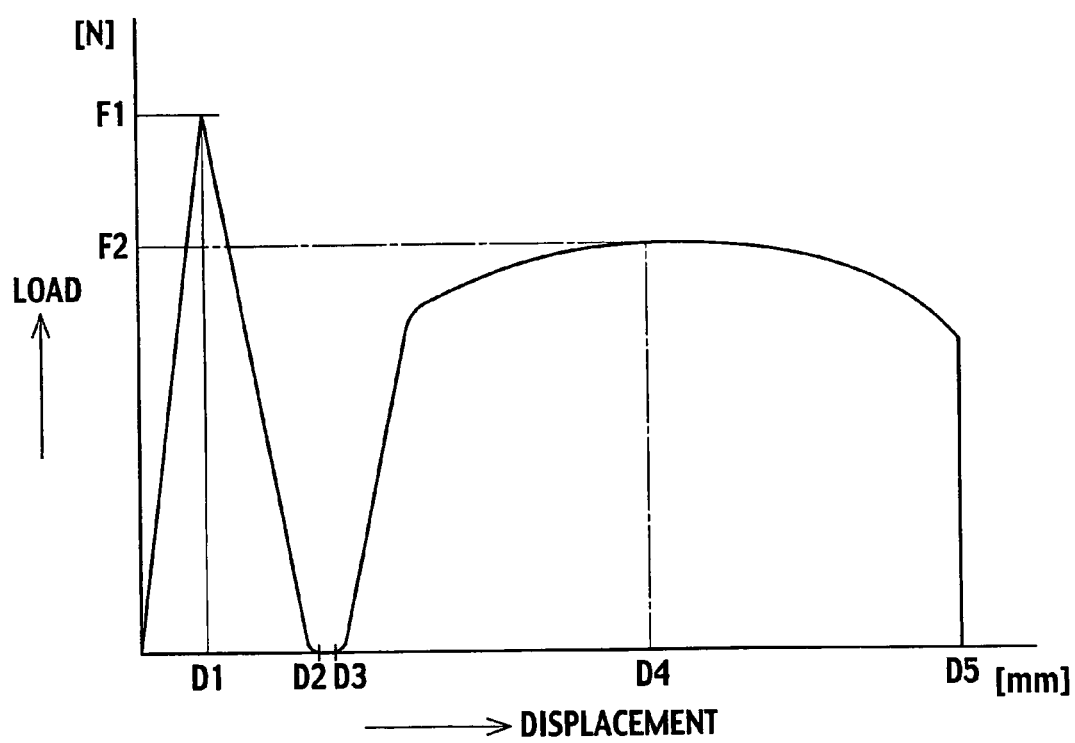
FIG. 12 is a graph indicating a relative curve between displacement of the axis supporting element and an energy absorbing load in the first embodiment.

In case where an impact load has been applied in an axial direction via the shift lever 3 by an occupant's contact or the like (FIG. 11A), an energy absorbing load (i.e. a load for absorbing an impact energy) may reach a predetermined load F1 at a position of displacement D1 shown in FIG. 12. In this case, the beams 6c of the axis supporting elements 6 break off due to bending stress (FIG. 11B) and then the shift lever 3, the rotational axis 2, the bearing sheets 5 and the axis supporting elements 6 drop off toward the opening 4b opened at the bottom of the yoke 4 (FIG. 11C). The axis supporting elements 6 slides downward to a position of displacement D2 as being guided by the side walls 4e and 4f of the yoke 4. And then the bulges 6c provided the bottom of the axis supporting elements 6 start to push centers of the metal plates 8 downward from a position of displacement D3 and thereby the metal plates 8 are bent downwards (FIG. 11D). The energy absorbing load reaches a load F2 at a position of displacement D4 and the metal plates 8 drop off from the hooks 4i at a position of displacement D5 (FIG. 11E). Impact energy is absorbed until the position of displacement D5 by bend deformation of the metal plates 8.

As described above, in the present embodiment, in case where an impact load is applied via the shift lever 3, an impact energy can be absorbed in two steps of breaking off of the beams 6c and bending of the metal plates 8 as the axis supporting elements 6 can be displaced in a relatively long distance. Therefore, stroke displacement for energy absorbing can be made relatively long. In addition, since impact energy is absorbed by bending deformation of the metal plates 8, relatively large impact energy can be absorbed with shorter stroke displacement than stroke displacement for energy absorbing in a conventional shift lever assembly. Furthermore, the above-mentioned energy absorbing load can be easily adjusted in accordance with an impact load by adjusting dimension (width, thickness or the like) of the metal plates 8. Since elements for energy absorbing are the metal plates 8, severely high dimensional accuracy is not needed for a coupling (shifting) structure.

In addition, in the present embodiment, a pair of the metal plates 8 are disposed within the moving range of a pair of the axis supporting elements 6 at displacing after breaking-off due to an impact load applied via the shift lever 3, respectively. And the metal plates 8 extend in the direction perpendicular to the moving direction of the axis supporting elements 6. Therefore, each axis supporting element 6 pushes one surface of each metal plate 8 in the perpendicular direction to be able to bend the each metal plate 8 under a stable condition.

Furthermore, in the present embodiment, the shift lever assembly 30 can be made low-cost and light-weighted by making the yoke 4 and the base 31 of resin.

Second Embodiment

Next, a shift lever assembly in a second embodiment according to the present embodiment will be explained with reference to FIGS. 13 to 16. Since components in the present embodiment other than a shift lever main element 1A are the same as those in the above-explained first embodiment, only the shift lever main element 1A is shown in the drawings. Note that some components of the shift lever main element 1A in the second embodiment are identical or similar to those of the shift lever main element 1 in the first embodiment. Therefore, such components are allocated with same numerals as those in the first embodiment to omit their redundant descriptions.

Figure 13:
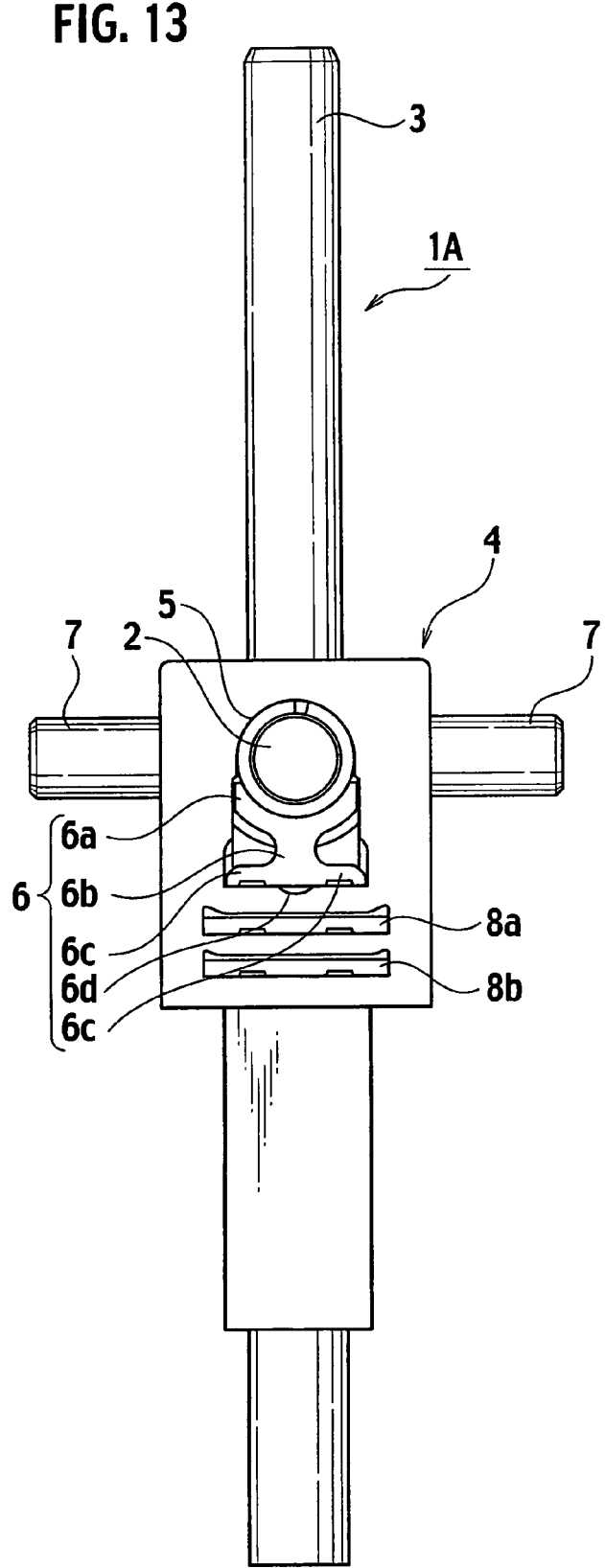
FIG. 13 is a front view of a shift lever main element of a shift lever assembly according to a second embodiment of the present invention.
Figure 14:
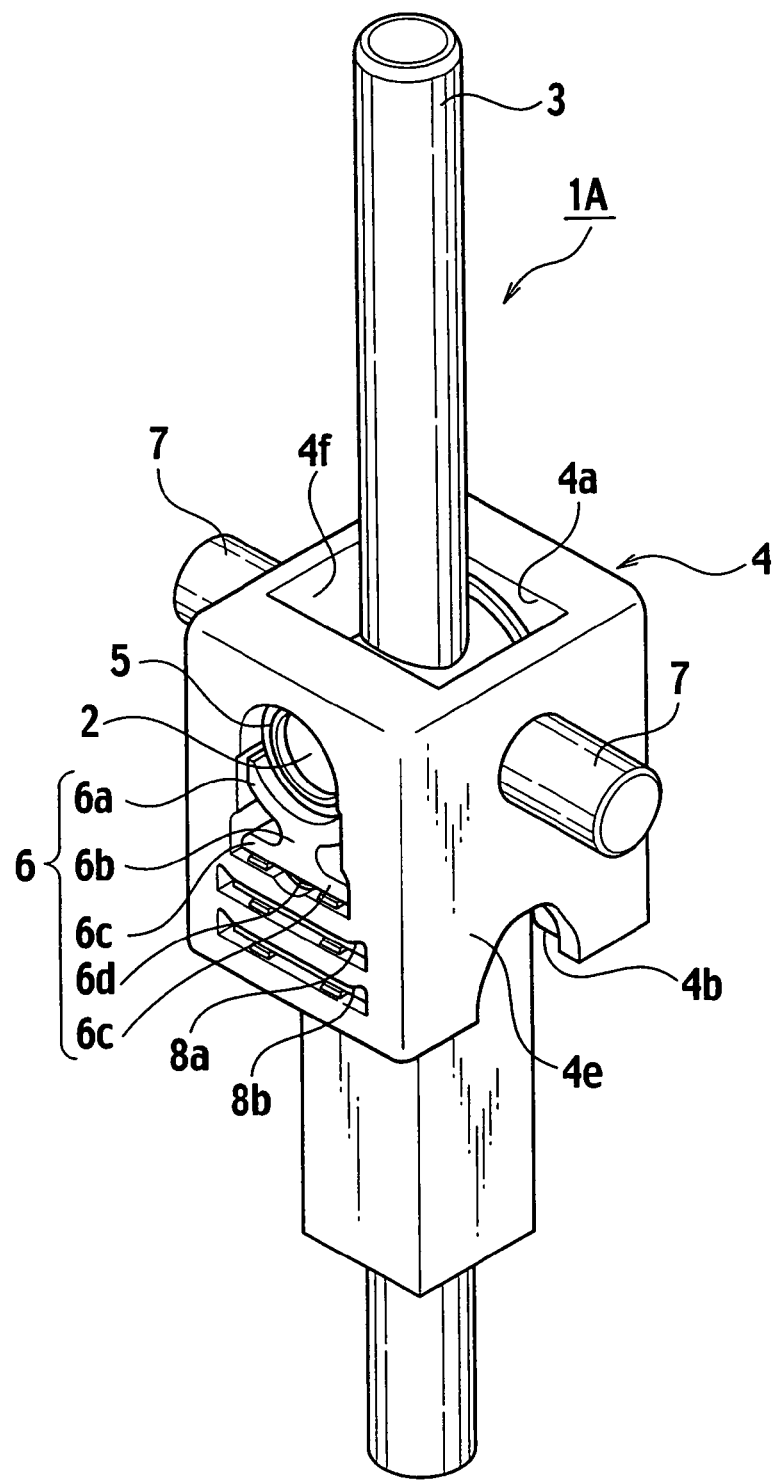
FIG. 14 is a perspective view of the shift lever main element in the second embodiment.
Figure 15:
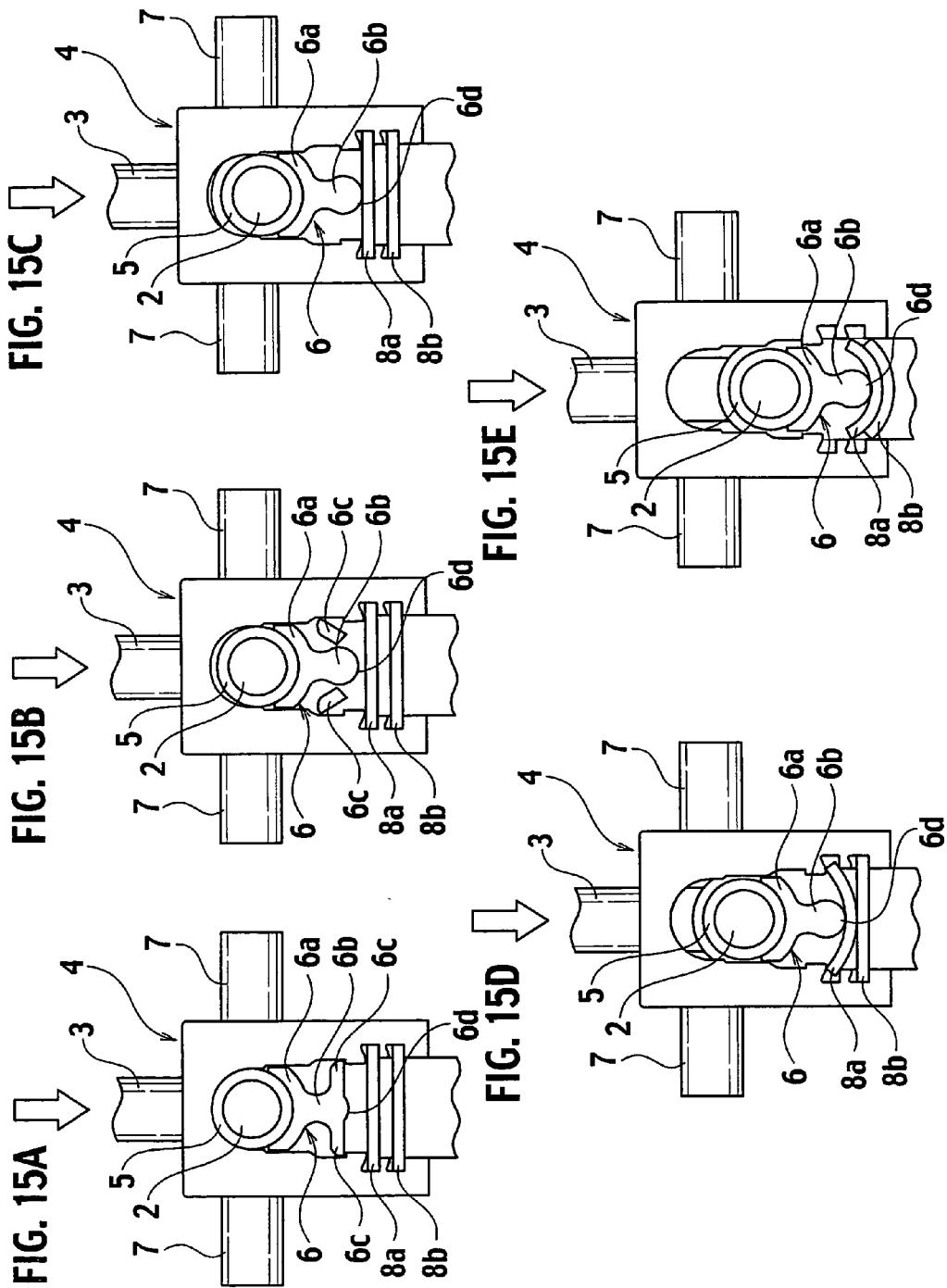
FIGS. 15A to 15E are explanatory diagrams showing an operation of the assembly in the second embodiment when applying an impact load to a shift lever.

As shown in FIGS. 13 and 14, the different number of the metal plates 8 are provided with the shift lever main element 1A from the shift lever main element 1 in the above-described first embodiment. Specifically, two metal plates 8a and 8b are provided within a moving range of each axis supporting element 6. The layered metal plates 8a and 8b extend direction almost perpendicular to a moving direction of the axis supporting element 6, respectively. Both ends of the metal plates 8a and 8b are laid on hooks 4i on an inner surface of a yoke 4, respectively. Note that the hooks 4i are not shown in FIGS. 13 to 15. However, they are provided in the same way as the hooks 4i in the first embodiment. The hooks 4i in the present embodiment are provided in two layers.

Figure 16:
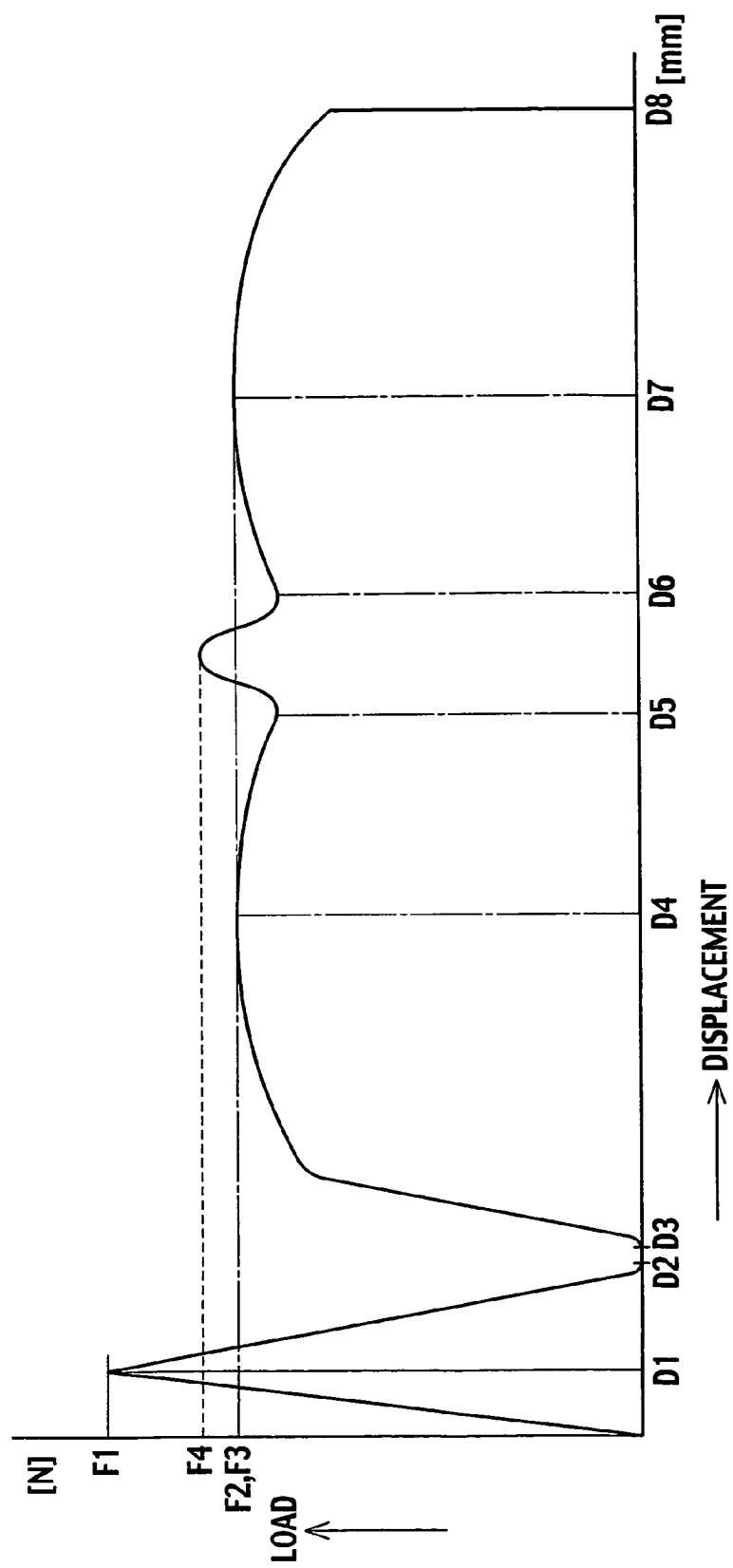
FIG. 16 is a graph indicating a relative curve between displacement of the axis supporting element and an energy absorbing load in the second embodiment.

In case where an impact load has been applied in an axial direction via the shift lever 3 by an occupant's contact or the like (FIG. 15A), an energy absorbing load may reach a predetermined load F1 at a position of displacement D1 shown in FIG. 16. In this case, the beams 6c of the axis supporting elements 6 break off due to bending stress (FIG. 15B) and then the shift lever 3, the rotational axis 2, the bearing sheets 5 and the axis supporting elements 6 drop off toward the opening 4b opened at the bottom of the yoke 4 (FIG. 15C). The axis supporting elements 6 slides downwards to a position of displacement D2 as being guided by the side walls 4e and 4f of the yoke 4. And then the bulges 6c provided the bottom of the axis supporting elements 6 start to push centers of the upper metal plates 8a downward from a position of displacement D3 and thereby the upper metal plates 8a are bent downwards (FIG. 15D). The energy absorbing load reaches a load F2 at a position of displacement D4. The upper metal plates 8a start to push centers of the lower metal plates 8b downward at a close position of displacement D5 and all the metal plates 8a and 8b are start to be bent with the energy absorbing load reaching a load F4. Subsequently the upper metal plates 8a drop off from the hooks 4i at a close position of displacement D6 and then only the lower plates 8b are bent. The energy absorbing load reaches a load F3 at a position of displacement D7 and the lower metal plates 8b drop off from the hooks 4i at a position of displacement D8 (FIG. 15E). Impact energy is absorbed until the position of displacement D8 by bend deformation of the metal plates 8a and 8b.

According to the second embodiment, the same advantages can be achieved as those in the first embodiment. In addition, in the present embodiment, since the layered two metal plates 8*a* and 8*b* are sequentially bent by each of the axis supporting elements 6, impact energy can be absorbed in a relatively long displacement. As a result, capacity for absorbing impact energy can be increased.

Third Embodiment

Next, a shift lever assembly in a third embodiment according to the present embodiment will be explained with reference to FIGS. 17 to 19. Since components in the present embodiment other than a shift lever main element 1B are the same as those in the above-explained first embodiment, only the shift lever main element 1B is shown in the drawings. Note that some components of the shift lever main element 1B in the third embodiment are identical or similar to those of the shift lever main element 1 in the first embodiment. Therefore, such components are allocated with same numerals as those in the first embodiment to omit their redundant descriptions. Note that walls of an axis supporting bracket (yoke) 4 is partially removed in FIG. 18 in order to make an inside of the axis supporting bracket conspicuous.

Figure 17:
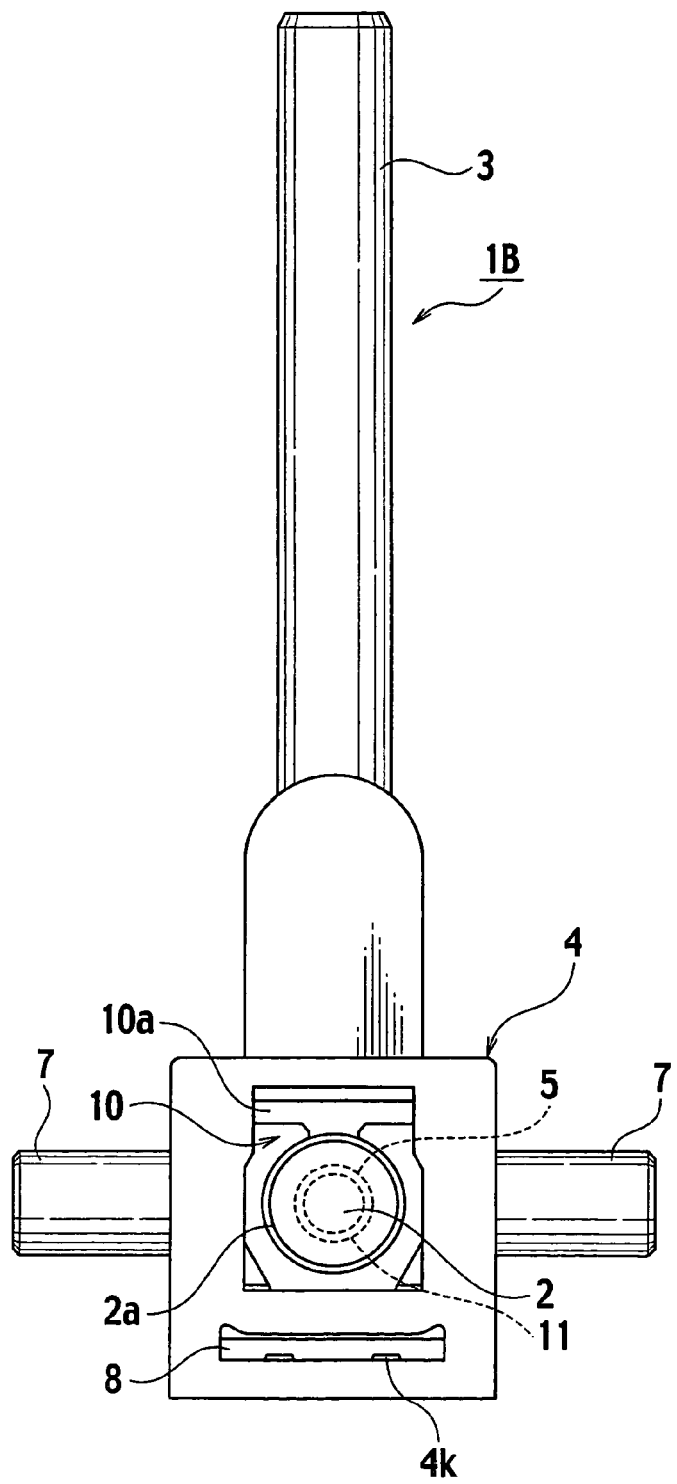
FIG. 17 is a front view of a shift lever main element of a shift lever assembly according to a third embodiment of the present invention.
Figure 18:
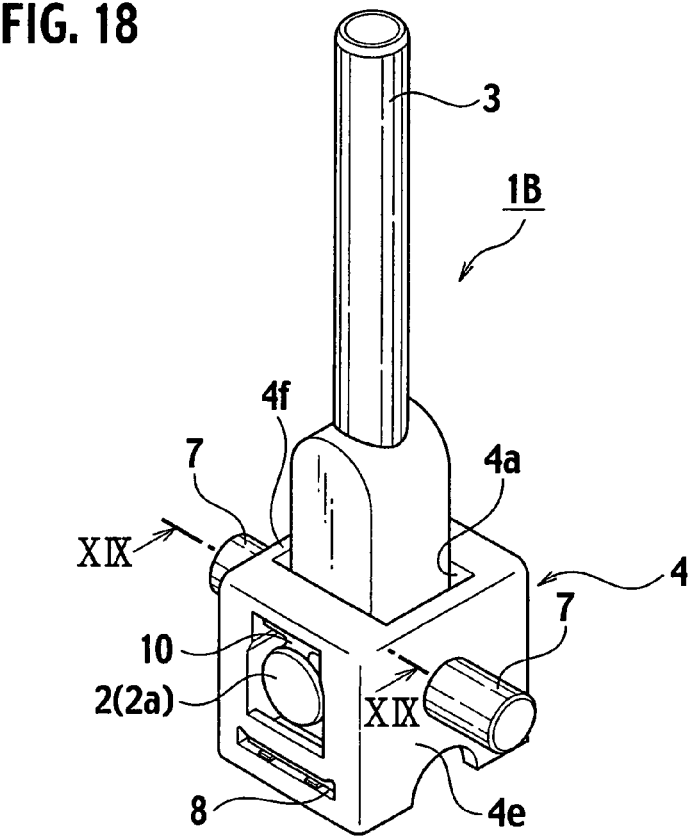
FIG. 18 is a perspective view of the shift lever main element in the third embodiment.
Figure 19:
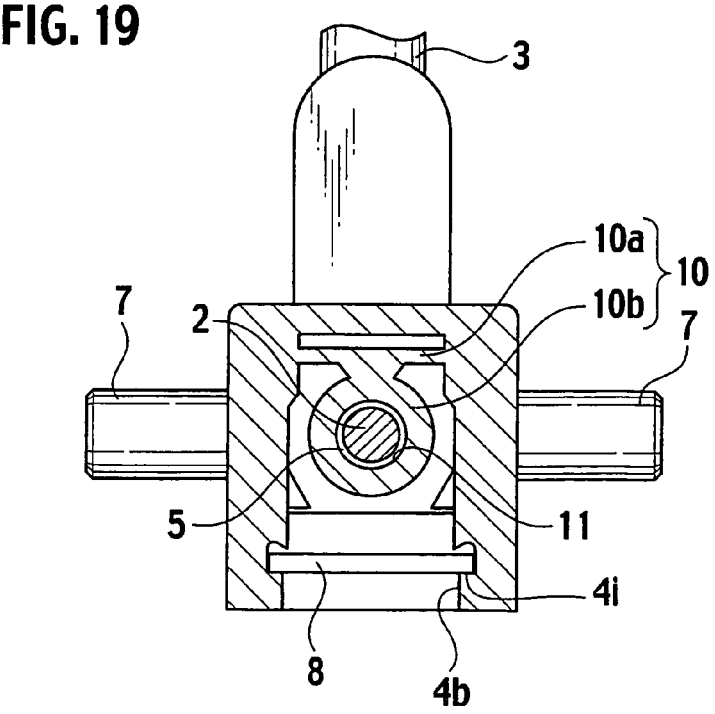
FIG. 19 is a cross-sectional view taken along a line XIX-XIX in FIG. 18.

As shown in FIGS. 17 and 18, the shift lever main element 1B includes a pair of axis supporting elements 10 each having a different structure from the axis supporting elements 6 in the above-described first embodiment. Specifically, each of the axis supporting elements 10 is integrally formed with the yoke 4 and is provided between the side walls 4*e* and 4*f* of the yoke 4, respectively. Each of the axis supporting elements 10 includes a beam 10*a* and an axis supporting ring (elements) 10*b*. The beam 10*a* is fixed at its both ends and will be break off in case where an impact load is to be applied via the shift lever 3. The axis supporting ring 10*b* projects downwards from a center of the beam 10*a*. A hole 11 is formed on the axis supporting ring 10*b* for holding on of the both ends of the rotational axis 2.

In addition, a hole (not shown) having an inner diameter capable of being inserted with the rotational axis 2 is formed at a lower end of the shift lever 3. The rotational axis 2 is inserted into the holes 11 of the axis supporting ring 10*b* and also the above-mentioned hole of the shift lever 3 and thereby the shift lever 3 is swingably supported on the yoke 4. A head 2*a* is integrally formed at one end of the rotational axis 2 and a push nut (not shown) or the like is fixed on another end of the rotational axis 2 to prevent a drop-off of the rotational axis 2 from the yoke 4.

In case where an impact load has been applied in an axial direction via the shift lever 3 by an occupant's contact or the like, the beams 10*a* of the axis supporting elements 10 firstly break off due to shear stress and then the shift lever 3, the rotational axis 2, the bearing sheets 5 and the axis supporting rings 10*b* of the axis supporting elements 10 drop off toward the opening 4*b* opened at the bottom of the yoke 4. The axis supporting elements 10 move downwards and then start to push centers of the metal plates 8 and thereby the metal plates 8 are bent. Impact energy is absorbed until the metal plates 8 drop off from the hooks 4*i*.

According to the third embodiment, the same advantages can be achieved as those in the first embodiment. In addition, in the present embodiment, since the pair of the axis supporting elements 10 is integrally formed with the yoke 4 to prevent the axis supporting elements 10 from being provided separately from the axis supporting bracket, the number of components can be reduced.

Although the favorite embodiments of the present invention have been described above, the present invention is not limited to the above embodiments and can take various configurations.

For example, in the second embodiment, the layered two metal plates 8*a* and a8 are provided within the moving range of each of the axis supporting elements 6, respectively. However, three or more layered metal plates can be provided. In this case, impact energy can be absorbed in a longer distance with the layered metal plates being bent by the axis supporting elements 6 and thereby the absorbed impact energy can be increased.

In the first to third embodiments, the axis supporting elements (rings) 6 and 10 are provided in the yoke 4 in relation to the rotational axis 2 for the manual shift mode of the shift lever assembly 30. However, the present invention is not limited to this configuration and the energy absorbing structure can be applied in relation to the rotational axis 7 in the base 31 for changing the shift range positions of the shift lever assembly 30, for example. Furthermore, the present invention can be applied in relation to a rotational axis for changing shift range positions of a shift lever assembly which doesn't include a manual shift structure. These above examples can have a relatively simple structure as well as the above first to third embodiments.

What is claimed is:

1. A shift lever assembly, comprising:
a swingable shift lever having a rotational axis as a swing support point;
an axis support bracket supporting the rotational axis;
a pair of axis support elements supporting both ends of the rotational axis together with the axis support bracket;
a plurality of breakable beams provided with the axis support elements, wherein at least one of the plurality of breakable beams breaks off if a predetermined impact load is applied via the shift lever; and
a plurality of bendable metal plates provided with the axis support bracket, wherein at least one of the plurality of bendable plates bends in response to being pressed by at least one of the axis support elements after at least one of the plurality of breakable beams breaks.

2. The shift lever assembly according to claim 1, wherein:
at least one of the plurality of bendable metal plates is provided for each of the axis support elements,
the at least one bendable metal plate is disposed within a range where the each of the axis support elements move, and
the at least one bendable metal plate extends in a direction almost perpendicular to a moving direction of the each of the axis support elements.

3. The shift lever assembly according to claim 1, wherein equal numbers of the plurality of bendable metal plates are provided in layers between each of the axis support elements, and
the layers are disposed within a range where each of the axis support elements move, and
the layers extend a direction almost perpendicular to a moving direction of each of the axis support elements.

4. The shift lever assembly according to claim 1, wherein the pair of axis support elements is integrally formed with the axis support bracket.

* * * * *